July 18, 1972     SABURO HASHIMOTO     3,677,895

ALKANE UTILIZATION IN FOAM SYSTEM

Filed Jan. 22, 1970     2 Sheets-Sheet 1

INVENTOR.
SABURO HASHIMOTO
BY
*Robert ...*
ATTORNEY

July 18, 1972  SABURO HASHIMOTO  3,677,895
ALKANE UTILIZATION IN FOAM SYSTEM
Filed Jan. 22, 1970  2 Sheets-Sheet 2

INVENTOR.
SABURO HASHIMOTO
BY
ATTORNEY

United States Patent Office 3,677,895
Patented July 18, 1972

3,677,895
ALKANE UTILIZATION IN FOAM SYSTEM
Saburo Hashimoto, Yorba Linda, Calif., assignor to Union Oil Company of California, Los Angeles, Calif.
Filed Jan. 22, 1970, Ser. No. 5,004
Int. Cl. C12d 13/06
U.S. Cl. 195—28 R    20 Claims

ABSTRACT OF THE DISCLOSURE

A method is described for the culture of microbial cells on hydrocarbons utilizing paraffinic hydrocarbons as the raw material to achieve a highly economic process for the production of protein from hydrocarbons. The culture medium comprises an aqueous foam composition which contains, as the discontinuous gaseous phase, one or both of oxygen and a gaseous hydrocarbon reactant. The culture medium is contained in the continuous aqueous interface surrounding the gaseous reactant in the discontinuous phase. In a typical application, an aqueous medium containing inorganic nutrients, microorganisms, and a foam stabilizer is foamed with methane to provide a foam composition containing approximately 20 volumes methane per liquid volume of the aqueous medium. This foam composition is placed in a fermentation vessel and contacted therein with a vapor stream containing oxygen, e.g., air, for a period of about 1.5 to 5 hours, sufficient to permit the microorganism content of the aqueous medium to approximately double in weight. Alternatively, a similar foam with air in the discontinuous phase is also formed and the two foams are intimately mixed. The foam composition is removed from the fermentation vessel and the bacterial cells are concentrated by various solid-liquid separators and finally dried to recover cellular matter containing approximately 60 percent protein.

DESCRIPTION OF THE INVENTION

This invention relates to a biochemical process and, in particular, relates to a biochemical process for growing microbial cells on gaseous hydrocarbons.

The present deficiency of protein for the world population is approximately 2 to 3 million tons and this deficiency is expected to become greater in forthcoming generations. Accordingly, considerable attention has been directed to non-agrarian methods for the production of necessary foodstuffs and recent attention has been directed to methods for the preparation of protein from petroleum. Most of the work with the preparation of proteins on petroleum hydrocarbons has concentrated on use of normally liquid paraffins as the feed material.

The two most costly items in the production of petroleum protein are the cost of the normal paraffin feedstock and the operating and utility cost for aeration and agitation of the culture medium. Together, these items constitute from 28 to 47.5 percent of the cost for production of the protein. These two items significantly affect the economics of petroleum protein and, considered together, cause the production costs of petroleum protein to exceed that of soybean meal protein.

It is thus apparent that the commercialization of protein synthesis from petroleum hydrocarbons requires a more efficient process than has heretofore been devised. Specifically, substantial savings could be made in the production cost by use of less costly raw materials and/or reduction in aeration and agitation costs.

The use of methane or natural gas for the preparation of protein has not been investigated thoroughly, despite the obvious cost advantage of such inexpensive hydrocarbons, because of the difficulty in providing a practical process using these gaseous hydrocarbons.

It is therefore an object of this invention to provide a method having significantly improved operating efficiency for the utilization of paraffinic hydrocarbons to supply energy and carbon in the microbial synthesis of proteins.

It is also an object of this invention to provide a process that can efficiently utilize gaseous hydrocarbons as the source of energy and carbon in the microbial synthesis of protein.

It is a further object of this invention to provide a culture medium incorporating a gaseous hydrocarbon in a manner permitting the rapid and efficient utilization thereof by microbial organisms.

Other and related objects will be apparent from the following discussion.

The aforementioned objectives are achieved by the process of this invention which utilizes a foamed biochemical culture medium which contains either or both of the gaseous hydrocarbon and oxygen reactants in the discontinuous gas phase which is contained within the foam composition. When the hydrocarbon is a liquid under fermentation conditions, the oxygen is contained in the discontinuous gas phase of the foam. When the hydrocarbon is in the vapor state, either or both the hydrocarbon and oxygen are contained in the discontinuous gas phase. When only one of these gaseous reactants is in the discontinuous gas phase of the foam, the foam composition can be passed in a thin film contact with the other of the reactant gases so that the microorganisms contained within the aqueous culture medium are supplied the hydrocarbons and oxygen as these reactants are utilized by the cells. In the preferred embodiment, one portion of the aqueous culture medium is foamed with the gaseous hydrocarbon as the discontinuous gas phase and a second portion of the aqueous culture medium is foamed with an oxygen-containing gas. The resultant foams are blended to supply the microorganism with the hydrocarbons and oxygen as these reactants are utilized by the cells. The blended foams are passed into a fermentation vessel at optimum culture conditions, e.g., temperature from about 15° to about 60° C. and a pressure from about 1 to about 10 atmospheres.

The invention will now be described by reference to the drawings which:

Figure 1:
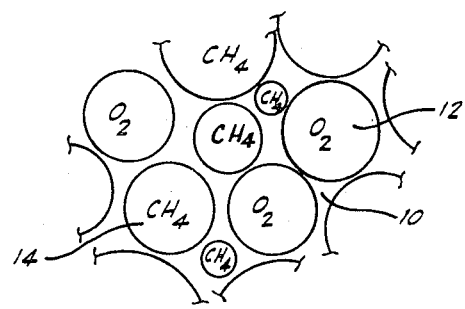
FIG. 1 illustrates a foam composition used in this invention.

The aqueous culture medium contains the various inorganic nutrients necessary for optimum microorganism growth. The inorganic nutrients which are employed for this purpose include a source of sulfur, nitrogen, potassium, magnesium, phosphorus and chlorine, as well as various micronutrients such as manganese, copper, boron, iron, zinc, etc. These micronutrients can be supplied at concentrations from 0.001 to about 1.0, preferably 0.01 to about 0.1 weight percent based on the culture medium. The major inorganic nutrients can be employed at concentrations from about 0.1 to about 5.0 weight percent of the culture medium; preferably from about 0.05 to about 1.0 weight percent of each of the following are used: sulfur, nitrogen, potassium and phosphorus. The nutrients are preferably supplied as water soluble salts. Examples of these include the alkali metal and ammonium chlorides, sulfates, nitrates, phosphates, as well as the sulfates, nitrates, chlorides of magnesium and any of the aforementioned minor or trace elements, e.g., ferrous sulfate, manganese chloride, molybdenum nitrate, sodium molybdate, sodium borate, cupric chloride, zinc sulfate, etc.

The fermentation is an exothermic oxidation and facilities can be provided for cooling the foam culture and/or aqueous medium between refoaming steps to maintain the optimum temperature for growth of the microorganisms. The temperature can be from about 15° to 60° C., preferably from 20° to 45° C. This temperature can be maintained by direct contact of the foam with a cooled gas that is bubbled through the foam such as an inert gas, e.g., nitrogen or carbon dioxide, or one of the reactive gases of the oxygen-containing gas or gaseous hydrocarbons. The foam can also be cooled by indirect heat exchange using cooling coils or other means immersed in the foam contained in a fermentation vessel.

The aqueous medium tends to become acidic during fermentation from acidic fermentation intermediates and products. The pH value of the aqueous culture medium should be from about 3 to 6 for optimum growth of yeasts and molds and from about 6.5 to 8 for optimum growth of bacteria. To maintain the pH within these optimum ranges, various buffer agents can be incorporated in the aqueous medium such as: alkali metal or ammonium acetates, mono- and di- alkali metal orthophosphates or pyrophosphates, alkali metal citrates, boric acid and alkali metal borates, etc. These can be used in concentrations from about 0.01 to 3.0 weight percent, with the particular buffer system being selected on the basis of the value of the optimum pH desired in the solution. The pH can also be controlled by periodic or continuous addition of an alkaline material such as amomnia, alkali metal hydroxides, etc. in amounts sufficient to correct any deviation from the desired pH value.

The length of the fermentation process varies considerably with the activity of the particular microorganism. The process is preferably continued throughout the period of exponential growth rate of the microorganism, a period that can be from about 3 to about 48 hours. Preferably, the fermentation time is from about 10 to about 20 hours.

The approximate period of time required for the microorganisms to double in the aqueous culture medium varies from about 1.5 to about 7.0 hours. Preferably the microorganisms selected have sufficient activity and the conditions for the cell growth are optimized to achieve a doubling weight of about 1.5 to about 4.5 hours, and most preferably from about 1.5 to about 3.0 hours. Also, it is preferred to introduce the microorganisms at their exponential growth phase rather than the initial lag phase or the steady state or stationary phase. To continue the propagation of the microorganism, a sufficient portion of the microorganism is removed from the process while it is still in the exponential growth phase and this is used to innoculate the succeeding batch. The culture medium is preferably maintained as a foam composition for the duration of its residence in the fermentation step and this will usually require refoaming of the liquid medium at periodic intervals. Foams of shorter durations than the doubling life of the microorganism can be used and, in some cases are preferred. Foams of short durations, e.g., from 15 to about 90 minutes, can be repeatedly refoamed with fresh gaseous reactant during the fermentation process. This technique may actually be preferred when the process requires a high volume of gaseous reactants, e.g., when air and/or methane constitute the gaseous reactants. The use of repeated refoaming provides more stable foam since gas to liquid volumetric ratios in the foam on the order of from 2 to about 25 can be achieved rather than 200 to about 300 which would be required for doubling the microorganism content if all the gaseous reactants were to be foamed in a single step.

In the preparation of the foam, the gaseous agent employed in the discontinuous phase, i.e., either oxygen, an oxygen-containing gas, or the gaseous hydrocarbon or a gas containing the gaseous hydrocarbon, is mixed in proportions to the aqueous medium from about 3/1 to about 40/1 volumes per liquid volume. Preferably the volumetric proportions are from about 5/1 to about 20/1, and most preferably from about 7/1 to about 15/1, parts of the discontinuous gas per part by volume of the liquid.

The stability of the foam can be controlled by various means. In the preferred method, foaming agents and/or foam stabilizers are employed that will provide foams having stabilities of from 15 minutes to about 7 hours. The foaming agents include various oil-in-water surface active agents such as nonionic, cationic and anionic surfactants which are well known in the art. The foam stabilizers include any of the well known water soluble polymers and fatty amines which have been used as protective colloids in various aqueous suspenion and emulsion techniques. Illustration of these various materials will be set forth in succeeding paragraphs.

Various surface active agents can be added to achieve the lowered surface tension of the water and various water soluble polymers and viscous additives can be added to enhance the viscosity of the water and thereby stabilize the foam. Various mechanical techniques can be employed to produce the foam from the aqueous medium and the hydrocarbon vapor, e.g., a froth can be produced by admixing the aqueous medium and the gaseous agent under high mechanical agitation or, preferably, the gaseous agent can be injected immediately upstream of a mixing nozzle which discharges the aqueous medium and produces a foam.

The surface active agents which can be added to water to reduce its surface tensions from about 70 dynes per centimeter to a value of about 15 to about 50 dynes per centimeter, preferably to about 20 to about 40 dynes per centimeter, can in general be any of the conventional oil-in-water surfactants. The amount of the surface active agent so added can vary from about 0.1 to about 10, preferably from about 0.5 to 5 weight percent, and such surface active agent can be of the cationic, anionic or nonionic type.

Examples of the cationic surfactants include: fatty amines, e.g., dodecylamine, octadecylamine Armeens, Duomeens of Armour Chemical Company); alkarylamines, e.g., dodecyl aniline, fatty amides such as fatty imidazolines, e.g., undecylimidazoline prepared by condensing lauric acid with ethylene diamine or oleylaminodiethylamine prepared by condensing the oleic acid with diethylamine hydrochloride (Sapamine ECH by Ciba); quaternary alkyl and aryl ammonium salts and hydrates, e.g., cetyltriethyl ammonium cetyl sulfate, dimethylbenzyldodecyl ammonium chloride, etc.; quaternary ammonium bases of fatty amides of disubstituted diamines, e.g., oleyl methylamino ethylene diethylamine, methyl sulfate (Sapamine MS by Ciba), oleylbenzylamino ethylene diethylamine hydrochloride (Sapamine ECH by Ciba); fatty derivatives of benzimidazolines such as are prepared by condensation of a fatty acid with orthophenylenediamine followed by alkylation of the condensate with an alkyl halide to yield an N-alkyl alkylbenzimidazole, e.g., N-methyl N,N'-diethyl heptadecylbenzimidazole; N-fatty alkyl pyridinium compounds, e.g., lauryl pyridinium, octadecyl pyridinium (Fixanol of Imperial Chemical Industries), octadecyl methylene pyridinium acetate, etc. The fatty amines also stabilize the foams and can be used without any additional foam stabilizer or can be used with any of the other surfactants described herein to active foams that are quite stable and resist collapse for periods of from 5 to about 250 minutes or longer, depending on the concentration of the fatty amine.

Examples of useful anionic surface active agents include the following: fatty acid glyceride sulfonates and fatty acid sulfonates, e.g., sulfonated cottonseed oil, sulfonated oleic acid, sulfonated sperm oil, sulfonated tallow, etc.; sulfonated fatty amides, e.g., sulfonated amide of ricinoleic acid (Humectol CA by I. G. Farben), sodium salt of sulfuric ester of oleyl diisobutyl amide (Dismulgen V of I. G. Farben), etc.; sulfonated anilides of fats, e.g., sodium salt of sulfuric ester of oleylethyl anilide (Humectol CX by I. C. Farben), etc.; amides of aminosulfonic acids, e.g., sodium sulfonate of oleylmethyl tauride (Igepon T by I. G. Farben); amides from condensation of fatty acid chlorides with amino acids, e.g., sodium salt of oleyl sarcoside (Medialan A by I. G. Farben); sulfonated aromatic hydrocarbons, e.g., benzene sulfonic, naphthalene sulfonic acids and their ammonium and alkali metal salts, etc.; alkylaryl sulfonates, e.g., dodecylbenzene sulfonates, octadecylbenzene sulfonates, etc.

Illustrative nonionic compounds include the polyethylene oxide condensates with hydrophobic groups having a reactive hydrogen. The hydrophobic group can have from about 10 to 25 carbon atoms and from 2 to about 15 molecular weights of ethylene oxide are commonly condensed per molecular weights of hydrophobic group. The hydrophobic group can be selected from a variety of organic compounds having one or more reactive hydrogens including fatty alkyl or alkenyl alcohols, fatty acids, fatty amines, fatty amide, esterified hexitans or alkyl or alkenyl phenols.

As described, the source of the hydrophilic group is ethylene oxide. Other source materials can be employed, for example, ethylene chlorohydrin, or polyethylene glycol; however, because of its low cost and availability, ethylene oxide is used almost exclusively in the preparation of these materials.

The hydrophobic reactant can comprise an alkyl or alkenyl phenol wherein the alkyl or alkenyl group or groups contain between about 2 and about 16 carbon atoms. Among such compounds are the following: hexyl phenol, hexenyl phenol, hexadecyl phenol, dodecenyl phenols, tetradecyl phenol, heptenyl cresol, isoamyl cresol, decyl resorcinol, cetenyl resorcinol, isododecyl phenol, decenyl xylenol, etc. Examples of commercially available wetting agents belonging to this class and having a fatty acid constituent and containing ethylene oxide are the following: "Ninosol 100," "Ninosol 200" and "Ninosol 210" of the Alrose Chemical Company and "Napalcol 4-D" of the Nopco Chemical Company.

A third class of hydrophobic reactants comprises the alkyl and alkenyl alcohols containing between about 8 and about 22 carbon atoms. Among such alcohols are dodecanol, tridecanol, tetradecanol, pentadecanol, hexadecanol, heptadecanol, cotadecanol, decosenol, etc. A commercially available wetting agent of this type and containing ethylene oxide is Brij 30 of The Atlas Powder Company.

A fourth class of the hydrophobic reactants comprises long chain alkyl or alkenyl amines or amides containing between about 8 and about 22 carbon atoms. These compounds contain two reactive hydrogens and the polyethylene oxide units are distributed therebetween. Examples of such compounds are dodecanamide, tridecylamine, tetradecenamide, pentenyl amine, hexadecyl amine, heptadecanamide, octadecyl amine, oleic amide, etc. Examples of commercially available wetting agents in this group containing ethylene oxide are "Ethomide" of The Armour Chemical Company and "Priminox 10" of the Rohm and Haas Chemical Company.

Another class of suitable wetting agents are the reaction products of ethylene oxide with fatty acid partial esters of hexitans. Such compounds are obtained by treating a hexitol, e.g., sorbitol, manitol, dulcitol, etc.; with a dehydrating agent to form the corresponding hexitan, i.e., sorbitan, mannitan, dulcitan, etc. The hexitan is then partially esterfied with a long chain fatty acid, having between about 8 and about 22 carbon atoms, such as dodecanoic acid, pentadecanoic acid, hexadecanoic acid, oleic acid, stearic acid, etc., to replace one of the reactive hydrogens of the hexitan with the carboxylic radical. The resultant partial ester is then reacted with ethylene oxide. Commercially available compounds of this type are "Tween 65" and "Tween 81" of The Atlas Powder Company.

Very suitable emulsifiers comprise the organic substituted ammonium salts of sulfodicarboxylic acids that are reacted with various hydrophobic groups such as fatty amides having 12 to 18 carbons to prepare half amides in the manner described in 2,976,209, or with fatty amines having 12 to 26 carbons to prepare half amides in the manner described in 2,976,211, or with polyethoxylated fatty amines in the manner described in 3,080,280, or with fatty acid esters of hydroxyl amines to obtain half amides in the manner described in 2,976,208.

The surfactant will not interfere with most microorganism recovery steps. In some instances, however, the foaming tendency which it imparts to the liquid may be objectionable and, in such instances, the biodegradable surfactants constitute a preferred class of foaming additives. These surfactants are those possessing a hydrophobic portion having a predominantly straight chain aliphatic structure which is free of quaternary carbon atoms. Examples of these include alkyl sulfates, alkyl and alkenyl sulfonates as well as alkyl benzene sulfonates wherein the alkyl chain is substantially linear and does not possess a quaternary carbon near its free end. Nonionic surfactants such as straight chain polyglycols are also readily biodegradable. These biodegradable surfactants are oxidized by Pseudomonadaceae gram negative bacilli. To avoid interference of the surfactant with subsequent processing, e.g., with the recovery of the microorganisms, the aqueous medium can be innoculated with a species of the aforementioned bacilli which will slowly oxidize the surfactant during the fermentation. If, after the last fermentation step, the surfactant is still present in objectionable quantities, the aqueous medium can be passed to a hold tank maintained at optimum environmental conditions, with aeration and a temperature of about 30°–45° C. for a sufficient time, approximately 3 to 12 hours, to permit the microorganisms to oxidize the surfactant and reduce its concentration to manageable levels.

Various viscous additives can be added to the aqueous medium to increase its viscosity and thereby serve to enhance or stabilize the foam. These viscous additives are a class of water soluble polymers of natural or synthetic origin which are commonly used as protective colloids. These polymers commonly have molecular weights from 10,000 to 5,000,000 and can be naturally occurring materials, e.g., proteins, alginates, cellulose ethers or entirely synthetic polymers, e.g., polyvinyl alcohol, partially hydrolyzed polyacrylamide, maleic acid or anhydride copolymers, polyvinyl pyrrolidone and copolymers thereof, etc.

Examples of proteinaceous materials include the naturally occuring vegetable and animal proteins having molecular weights from about 34,000 to about 200,000. Examples of such include casein with a molecular weight of from about 12,000 to 98,000; edestin with a molecular weight from about 29,000 to 200,000; hemoglobin having a molecular weight from about 16,000 to 67,000; egg albumin having a molecular weight from about 33,000 to 34,000 or serum albumin having a molecular weight from about 70,000 to 80,000. Other proteins include glutenin obtained from wheat, keratin obtained from animal horn and hoof, etc. Ease of solubility can be attained by partial hydrolysis of the aforementioned proteinaceous materials in accordance with common practice.

The maleic polymers include copolymers and partially hydrolyzed copolymers of maleic anhydride or acid with interpolymerizable vinylidene monomers such as vinyl acetate, vinyl methyl ether, ethylene, isobutylene or styrene. These polymers can be prepared by conventional polymerization and, optionally, can be partially hydrolyzed in an aqueous medium at an elevated pH and temperature for a few minutes to several hours to promote water solubility. Also useful are polyvinyl pyrrolidone or copolymers of vinyl pyrrolidone and interpolymerizable vinylidene monomers such as vinyl methyl ether, vinyl acetate, vinyl butyl ether, styrene, etc.

Illustrative of commercially available polyvinyl-pyrrolidone are type NP, molecular weight of 40,000; K-60 molecular weight of 150,000 and K-90 molecular weight of 300,000.

Another class of suitable viscous additives include the partially hydrolyzed polyacrylamides and copolymers thereof with vinyl monomers such as vinyl acetate, methyl methacrylate, ethyl acrylate, methyl vinyl ether, having from 5 to about 80 percent of the amide groups hydrolyzed to carboxylic acids and water soluble salts thereof, e.g., the alkali metal, ammonium and alkaline earth metal salts such as sodium, lithium, calcium, magnesium, etc. The polyacrylamides are obtained by conventional vinyl polymerization using a free radical initiator to produce a high molecular weight polyacrylamide which can be partially hydrolyzed simultaneously with, or subsequent to its polymerization. The hydrolysis of the polymer can be achieved by prolonged exposure of the polymer to elevated pH and temperature conditions, e.g., treatment of an aqueous solution containing from about 2 to about 15 percent of a polyacrylamide with an aqueous solution of sodium bicarbonate, sodium-polyphosphate, trisodium orthophosphate, etc., at a pH of about 8 to 12 and a temperature from about 30° to 100° C. The hydrolysis is performed for a period of from about 2 to about 10 hours and sufficient to effect hydrolysis of from 5 to 8, preferably from about 12 to about 67 percent of the amide groups to carboxylic acid or the aforementioned soluble carboxylate groups.

Other additives that can be used to increase the viscosity of the material include the water soluble polyvinyl alcohol and partially hydrolyzed polyvinyl acetate or copolymers thereof with vinyl monomers such as allyl alcohol, ethyl acrylate, methyl methacrylate, methyl vinyl ether, butyl vinyl ether, etc. The polyvinyl alcohol is obtained by hydrolysis of polyvinyl acetate which, in turn, is obtained by the free radical solution, bulk or emulsion polymerization of vinyl acetate using a free radical initiator. The polyvinyl acetate is thereafter hydrolyzed by conventional means, e.g., an aqueous solution of the polymer is maintained at an elevated temperature from 50° to 125° C., for a period of from 15 to about 240 minutes, sufficient to hydrolyze the acetate groups. The resultant polyvinyl alcohol is thereafter recovered from the aqueous medium by conventional means, e.g., spray drying.

Other water soluble materials that can be used to enhance the viscosity of the aqueous medium include various water soluble alginates, e.g., sodium alginate, potassium aliginate, etc., as well as various cellulose derivatives such as carboxymethyl cellulose, hydroxyethyl cellulose, etc.

When the foam stabilizer is used, it is employed in a sufficient concentration to increase the viscosity of water to a level of about 5 to about 200 centipoises measured at 25° C., preferably to a viscosity of about 15 to about 75 centipoises. Of the aforementioned viscous additives, the proteinaceous materials are preferred since they exhibit desirable properties upon drying of the foam by maintaining the cellular integrity of the foam even though the water medium is evaporated from the foam.

The concentration of the surfactant and/or foam stabilizer can be varied to adjust the stability or life of the foam. The various surfactants and stabilizers form foams having varied stability for each surfactant or combination of surfactant and stabilizer. Generally, however, the surfactant and stabilizer exhibit their maximum effectiveness at concentrations from about 0.5 to 10 weight percent. Within this range, the concentration can also be varied to control the life of the foam. Thus a blend of about equal amounts of a dodecyl benzene sulfonate surfactant and a partially hydrolyzed soybean protein extract can be used at concentrations from 1 to about 15 weight percent to achieve foams having stabilities of from 5 to about 180 minutes, in direct proportion to the concentration of these additives.

The following table will illustrate foam compositions which can be formed in accordance with this invention. These foams have stabilities from about 5 to 300 minutes and are formed by discharging the liquid through a constricted nozzle while introducing the gas into the throat of the nozzle to mix with the liquid and form the foam composition.

The liquid also contains about 0.05 to about 5.0 weight percent of a suitable microorganism described hereinafter together with the inorganic nutrients previously described at concentrations from about 1 to 1000 parts per million and sufficient to sustain the microorganism.

As apparent to those skilled in the art, the surfactant and/or viscous additive to be used should be checked for toxicity to the particular microorganism that will be used. This can be simply performed by preparing a test culture media of the microorganism and with and without the foaming additives. The culture media are then incubated at their optimum temperature in an atmosphere rich in oxygen and the gaseous hydrocarbon. The culture medium is checked for growth after several hours to confirm that no inhibition of growth is present in the medium containing the foaming additives.

TABLE

| Example | Hydrocarbon substrate | Discontinuous phase | Volume ratio gas/liquid | Surfactant | Stabilizer |
|---|---|---|---|---|---|
| 1 | $CH_4$ | $CH_4$, air [1] | 10/1 | 3.8% dodecylamine | |
| 2 | $CH_4$ | $CH_4$ | 15/1 | 2.5% dodecylbenzene sulfonate. | 3% protein. |
| 3 | $C_3H_8$ | $O_2$ | 12/1 | 1.8% Ninosol 100 | 3% vinyl acetate-maleic anhydride copolymer. |
| 4 | $C_3H_8$ | $C_3H_8$, air [1] | 20/1 | 3% Tween 65 | 2% polyvinyl pyrrolidone. |
| 5 | $C_5H_{12}$ | $C_5H_{12}$ | 10/1 | 5% Igepon T | 1.5% polyvinyl alcohol. |
| 6 | 3% $C_{10}$-$C_{18}$ paraffins | Air | 15/1 | 5% Sapamine MS | 2% sodium alginate. |
| 7 | 5% $C_{10}$-$C_{18}$ paraffins | Air | 25/1 | 4% Ethomide | 4% protein. |

[1] The gaseous hydrocarbon and air are separately foamed, then blended to achieve a heterogeneous mixture of foam containing two discontinuous phases.
[2] The amount of hydrocarbon is expressed as a weight percentage of the liquid.

Referring now to FIG. 1, the foam composition is illustrated as a continuous aqueous phase 10 surrounding the discontinuous gas phase 12 and 14. The gas phase as illustrated is a heterogeneous mixture of methane and a gas comprising molecular oxygen and each bubble of these gaseous reactants is surrounded by the aqueous medium that contains the microorganism, the inorganic nutrients for its growth, as well as the foam additives described herein. The foam is prepared by admixing the liquid medium and the separate reactive gases, methane and oxygen, under frothing or foaming conditions and then blending the resultant foams into a single heterogeneous mixture. Alternatively, the reactive gases could be admixed and a single, homogeneous foam could be formed. It is preferred to use the heterogeneous mixture, however, to avoid explosive gas mixtures and/or to obtain a more efficient, utilization of the gaseous hydrocarbon reactant.

Although methane is illustrated as the hydrocarbon gas, any other normal paraffin that is gaseous at the fermentation conditions can also be used in the illustrated embodiment. Suitable hydrocarbons including methane, ethane, propane, butane, pentane, etc. The discontinuous hydrocarbon phase is preferably entirely a gaseous hydrocarbon such as any one or mixture of more than one of the aforementioned gaseous hydrocarbons. If desired, however, the discontinuous gas phase can be diluted with various inert or moderating materials, e.g., nitrogen, carbon dioxide, etc.

Although molecular oxygen is shown as the reactive gas, various inert diluents can be combined with this gas such as carbon dioxide, nitrogen, air, etc.

Either of the gaseous reactants can also be used in the unfoamed condition, thereby decreasing the volumetric gas to liquid ratio in the foam. Thus, methane or other gaseous hydrocarbon can be slowly bubbled through a foam containing molecular oxygen in the discontinuous gas phase or, alternatively, oxygen or air can be bubbled through a foam containing the gaseous hydrocarbon in the discontinuous phase. When the gaseous hydrocarbon is bubbled through the foam, unreacted hydrocarbon gases can be collected from the vapor space above the foam and recycled. These gases will be relatively free of contamination by the oxygen containing gas which remains trapped in the discontinuous foam phase so long as the foam is present in the fermentation vessel. Similarly, if air is bubbled through a foam having a discontinuous hydrocarbon gas phase, the gases from the foam can be vented without any significant loss of the hydrocarbon gas which will be entrapped in the foam until its absorption and oxidation by the aqueous culture medium.

The foam structure provides an ideal environment for growth of microorganisms. The mass transfer of gaseous reactants into the aqueous phase is enhanced by the very high interfacial surface area obtained in the foam. This environment is achieved with little or no stirring or mixing so that the high costs of agitation and aeration necessary in previous fermentation processes can be reduced to an insignificant amount.

The stability of the foam is controlled by the amount and identity of foaming additives to the aqueous medium so as to provide a foam stability from about 15 minutes to 7 hours. The foam stability should be related to the activity of the microorganism and the amount of reactive gases used in the foam material is such that the foam does not collapse before the gaseous reactants have achieved at least about 75, preferably at least about 85 percent, and most preferably about 95 percent conversion.

The invention is also applicable to a process using a hydrocarbon that is liquid at the fermentation conditions. In this embodiment, a gas containing molecular oxygen, e.g., oxygen or air, alone or diluted with an inert gaseous diluent such as nitrogen, carbon dioxide, etc., comprises the discontinuous gas phase which is contained within the continuous aqueous culture phase. The continuous aqueous phase also contains a dispersion of the liquid hydrocarbon used as the source of microbial energy and carbon. This dispersion can comprise from about 0.5 to 25, preferably from 1 to about 5 weight percent liquid hydrocarbon based on the aqueous culture phase.

Suitable hydrocarbons are the normal paraffins that are liquid at the fermentation temperature, e.g., the $C_6$ to $C_{20}$ normal paraffins including pentane, hexane, heptane, octane, nonane, decane, undecane, dodecane, tridecane, tetradecane, pentadecane, hexadecane, heptadecane, octadecane, nonadecane, licosane and mixtures thereof together with from 1 to about 80 weight percent, preferably from 1 to about 30 weight percent, of other, non-paraffinic hydrocarbons such as are present in most paraffinic petroleum stocks, e.g., gas oils, lubricating oil distillates, wax distillates, raffinates from aromatic extraction units such as Duo-Sol raffinate, etc.

The microorganism employed in the aqueous culture medium can be widely varied, depending on the particular hydrocarbon selected as the source of microbial carbon and energy as well as on the desired culture growth rates and characteristics. The microorganism can be of the Schizomycetes division including bacteria and Actinymycetes or the Eumycetes division including molds and yeasts. The yeasts are used with the normally liquid paraffinic hydrocarbons, i.e., the $C_5$ to about $C_{20}$ paraffins and can be of the family Cryptoccae, subfamilies Cryptococcoidae or Saccharomyceloidae. Examples of useful genera in these families are Torulopsis and Candida and examples of particular yeast species are:

*Candida lipolytica*
*Candida pulcherrima*
*Candida utilis*
*Candida utilis, variati major*
*Candida tropicalis*
*Torulopsis collisculosa*
*Hansenula anomala*
*Oidium lactics*
*Neurospora sitophila*
*Mycoderma cancoillote*

The fungi that can be used with the $C_5$ to $C_{20}$ paraffins include those of the family Aspergillaceae and genera, Penicillium or Aspergillus. Specific strains include *Penicillium expansum, Penicillium roqueforti, Penicillium notatum, Aspergillus fussigatus, Aspergillus niger, Aspergillus versicolor*, etc.

The bacteria that can be used can be those of the families Bacillaceae, Pseudomonadaceae and vary somewhat, depending on the hydrocarbon used as the source of microbial energy and carbon. Examples of these include the following:

| Hydrocarbon | Bacteria strain |
|---|---|
| Methane | *Bacterium methanicium.* *Bacterium fluorescens liquefaciens.* *Bacillus methanicus.* *Methanomanas methanica.* *Methanomanas methanooxidans.* *Pseudomonas methanitrificans.* *Methylococcus capsulatus.* *Graphium (fungus).* |
| Ethane | *Mycobacterium perrugossu ethanicum.* *Mycobacterium paraffinicum.* *Graphium (fungus).* |
| Propane | *Mycobacterium paraffinicum.* *Mycobacterium rubrum propanicu.* |
| Butane | *Mycobacterium paraffinicum.* |
| $C_5$ to $C_{20}$ paraffins | *Bacillus amylebacter.* *Pseudomonas natriegens.* *Arthrobacter sp.* *Micrococcus sp.* *Corynebacterium michiganense.* *Pseudomonas syringae.* *Xanthomonas begoniae.* *Flavobacterium sp. devorans.* *Acetobacter sp.* *Actinomyces sp.* *Agrobacterium sp.* *Aplanobacter sp.* |

Actinomycetes include those of the genera Proactinomycetes (Nocardia) and Streptomyces. Suitable strains include Nocardia salmonicolor and other closely related species.

The microorganism can be present in the aqueous culture medium at a concentration from about 0.05 to about 5 weight percent, preferably from about 0.5 to 3, and most preferably from about 0.7 to about 2 weight percent. The microorganism is maintained at conditions favoring its rapid, exponential growth and approximately double its concentration in the aqueous medium while in the fermentation vessel.

Figure 2:
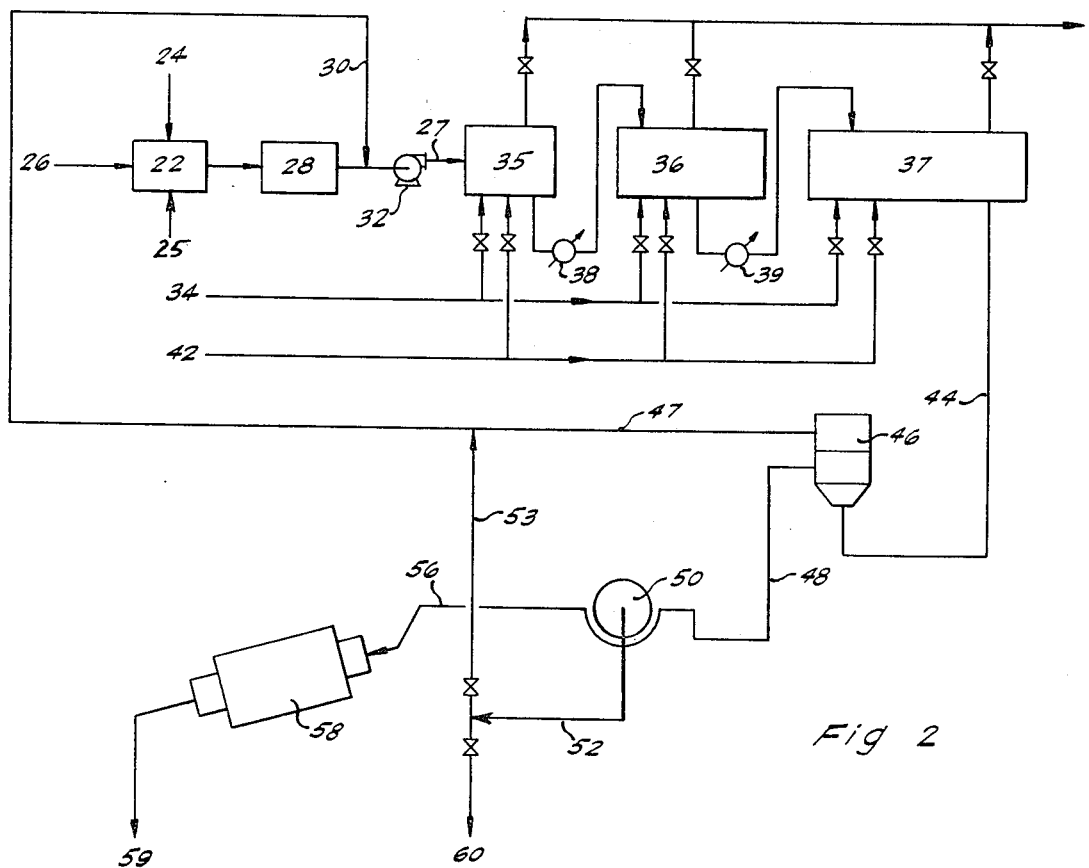
FIG. 2 is a flow diagram of a biochemical process utilizing the foam culture medium of this invention.

Referring now to FIG. 2, there is illustrated a process for carrying out the invention. In this process, an aqueous culture medium is prepared in zone 22 by dissolving the inorganic nutrients which are introduced through line 24 in water introduced through line 26. The foam additives, e.g., an equal weight mixture of dodecyl benzene sulfonate and a partially hydrolyzed soybean protein are introduced through line 25 in an amount sufficient to provide a concentration of this mixture from about 2 to 12 weight percent in the liquid added to the fermentation vessel through line 27. The nutrients are added through line 24 at a sufficient concentration to provide a final aqueous medium which is passed through line 27 of the following approximate composition of nutrients:

| Inorganic nutrients: | Weight percent |
| --- | --- |
| Calcium chloride | 0.01 |
| Ammonium sulfate | 0.1 |
| Ammonium carbonate | 0.01 |
| Monopotassium phosphate | 0.2 |
| Disodium phosphate | 0.3 |
| Magnesium sulfate | 0.02 |
| Micronutrients including soluble salts of iron, molybdenum, zinc, manganese and copper | 0.08 |

The aqueous medium can be passed through a sterilizer 28 where it is exposed to ultraviolet light, high temperature or other means for insuring an essentially sterile, aqueous medium which is then blended with the recycle stream 30. Pump 32 pressures the aqueous medium to moderate pressures, e.g., from 1 to about 15 atmospheres and the resulting aqueous medium is passed to the fermentation vessels 35, 36 and 37. Lesser or greater numbers of fermentation vessels can be used as desired or required by the processing conditions. The illustration has Methylococcus capsulatus, a doubling rate of 3 hours and the reaction vessels 35, 36 and 37 are provided to permit a residence time of the aqueous medium in each of the vessels of approximately 3 to 5 hours. The volume of each of these stages is progressively increased, i.e., doubled, in accordance with the increased demand for gaseous reactants of the growing microorganism culture.

In a typical embodiment for the production of 500 pounds protein per hour, the aqueous medium supplied through line 27 comprises about 47 gallons per minute and a total of 8500 gallons over the 3-hour period. This aqueous medium is admixed with 106 pounds of the microorganism culture for a concentration of the microorganism in the aqueous medium of 0.15 weight percent. The aqueous medium is introduced into the first stage of the fermentation process and is foamed therein with a total of 5,140 cubic feet of methane and 55,400 cubic feet of air at the fermentation conditions of 1 atmosphere and 45° C., the optimum propagation temperature or the microorganism culture.

Upon completion of the 3-hour fermentation period, the aqueous medium is discharged through cooler 38 which serves to maintain the temperature at the desired fermentation conditions and into the second stage fermentation vessel where the liquid is foamed with 10,300 cubic feet methane and 111,000 cubic feet of air which are introduced through lines 34 and 42, respectively. After the 3-hour residence time in fermentation vessel 36, the liquid is discharged through cooler 39 and into the final fermentation stage 37. In vessel 37, the liquid is foamed with a total of 30,600 cubic feet of methane and 222,000 cubic feet of air over the 3-hour residence period.

Upon completion of this 3-hour period, the liquid contents are discharged through line 44 and into one or more centrifuges depicted at 46. The liquid is centrifuged to recover an enriched microorganism stream which is removed through line 48 and which contains about 15 percent microorganism solids at a flow rate of about 9–10 gallons per minute. Some or all of the liquid filtrate from centrifuge step 46 can be recycled to the process to the line 47. Alternatively, to avoid accumulation of any toxins in the medium, the filtrate stream from separator 46 can be discarded and an entirely fresh aqueous medium can be used.

The enriched microorganism stream is passed into a vacuum filter 50 from which a microorganism-containing stream 56 is removed having a concentration of microorganisms of about 45 weight percent. This stream is passed at a flow rate of from about 2 to 5 gallons per minute into a dryer 58 where the remainder of the water is evaporated to recover a final microorganism product containing about 850 pounds of microorganism cells having a protein content of about 59 weight percent. A portion of the soybean protein used as a stabilizer in the foam is also recovered in the product and thereby enriches the useful protein in the final product. The aqueous filtrate removed from filter 50 is passed by line 52 and a portion for all of this aqueous medium is diverted to the drain through line 60 to prevent the buildup of toxins in the culture medium. If desired, however, a portion of this liquid medium can be recycled through line 53 to the process.

The conditions in the fermentation vessels 35, 36 and 37 can be varied considerably to achieve optimum economical processing. The pressure within these vessels can be from 1 to about 10 atmospheres and the gas to liquid volumetric ratio in the foam can be from 3 to about 50. In one embodiment, Case A, the liquid can be foamed only with the methane and thereafter air can be slowly introduced into the foam to bubble through the foam and thereby maintain the necessary aeration conditions for growth of the microorganisms. Alternatively, in Case B, the methane and air can both be foamed in these reaction vessels. To reduce the volumes of reaction space necessary, the foam stability can be adjusted to be less than the necessary residence time for the liquid culture medium in each of the three stages. In a typical embodiment, the foam stability can be adjusted to approximately 36 minutes by reducing the concentration of the foam additive mixture to about 2 to 5 weight percent and air and methane are introduced at 5 periodic introductions into each of the reaction vessels during the residency of the liquid culture medium in these vessels. In other processing, Case C, the vessels can be operated at superatmospheric pressure, e.g., 10 atmospheres, and all of the gases necessary can be charged into a foam which is maintained stable for the entire 3 hour residence time of the liquid in each of the reaction vessels. In still another alternative embodiment, Case D, the vessels can be operated at 10 atmospheres pressure with a foam stability of about 36 minutes, again achieved by the limited amount of foam additives, and the gases can be charged at 5 periodic intervals in each of the reaction stages. Finally, in yet another embodiment, Case E, all the methane can be charged into a foam at 10 atmospheres which is stable for 3 hours and air can be slowly bubbled through the foam over the 3 hour period. The following table summarizes the reaction volumes necessary in each of the stages and the gas-to-liquid ratio in the foam compositions for each of these embodiments:

TABLE

| Case | Pressure | Foam gas | Gas additions | Stage 1 G./l. | Stage 1 Vol. | Stage 2 G./l. | Stage 2 Vol. | Stage 3 G./l. | Stage 3 Vol. |
|---|---|---|---|---|---|---|---|---|---|
| A | 1 | CH₄ | 1 | 4.5 | 6,274 | 9.1 | 11,434 | 18.2 | 21,734 |
| B | 1 | CH₄ and air | 5 | 10.7 | 13,244 | 21.6 | 25,394 | 42.1 | 49,654 |
| C | 10 | ...do... | 1 | 5.4 | 7,188 | 10.6 | 13,264 | 21.2 | 25,394 |
| D | 10 | ...do... | 5 | 1.1 | 2,345 | 2.2 | 3,560 | 4.3 | 5,986 |
| E | 10 | CH₄ | 1 | 0.45 | 1,648 | 0.9 | 2,164 | 1.8 | 3,194 |

The preceding table illustrates the wide variety of gas to liquid ratios obtainable in the foam, e.g., ratios from 0.45 to 42.1 being shown.

Figure 3:
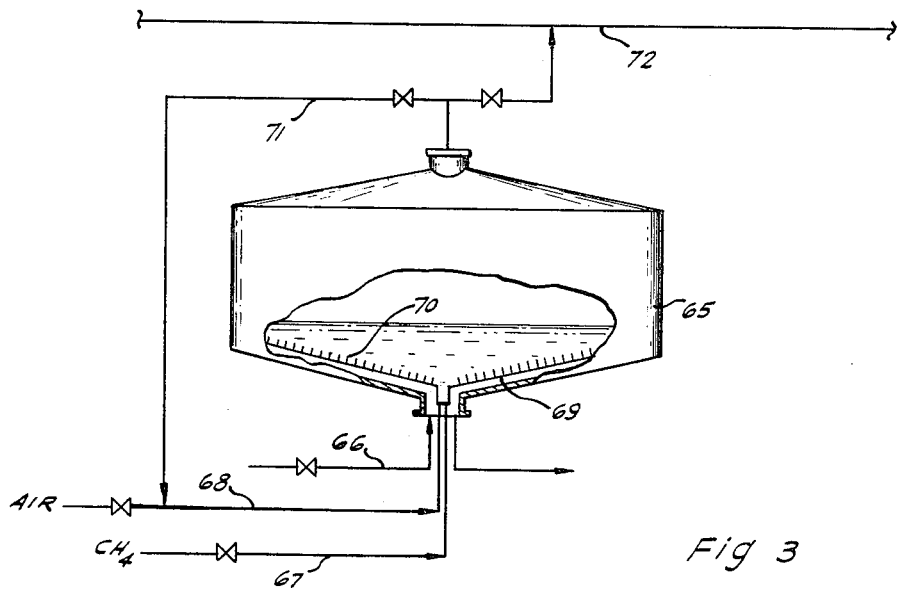
FIG. 3 illustrates a fermentation vessel for atmospheric pressure operation.

FIG. 3 illustrates a typical fermentation vessel which can be used with this invention. This fermentation vessel as illustrated is for application at atmospheric pressure operation and comprises a cylindrical vessel 65 that is, preferably, entirely enclosed. The liquid aqueous medium is introduced through line 66 and is contacted in the reaction vessel with the foaming gas, methane introduced through line 67 and/or air introduced through line 68. The gases so introduced are passed into contact with the liquid through spargers 69 and 60 which are positioned at the base of the vessel and which can be adapted for rotation about the axis of the vessel. In such an embodiment, each of the arms of the sparger can be adapted for introduction of the air or methane or, alternately, a plurality of fixed spargers can be used with alternate nozzles being adapted for introduction of the methane and air, thereby insuring an intimate mixture of the heterogeneous foam containing methane and air as separate, discontinuous phases.

The foaming nozzles which are positioned along the sparger arms within the tank can be conventional foaming nozzles in which the gas is injected at a moderate pressure drop, e.g., from about 20 to about 120 p.s.i. as it passes through a constricted throat of the nozzle. Ports are placed in the throat of the nozzle to induce the liquid contained within vessel 65 into admixture with the gas, thereby forming a foam composition as the gas is discharged from the nozzle.

As illustrated, the foam is formed by partially filling vessel 65 with the liquid aqueous culture medium to immerse the gas sparger beneath the liquid level. The gases are then introduced at sufficient pressures and flow rates to form a stable foam with the liquid contained within the vessel. During the formation of the foam, some of the off gases can be recycled as desired through line 71 which returns the gases to the air line for further foaming. After the foam has been formed, the gases are trapped within the foam composition and, at that time, the recycle through line 71 is discontinued and the gases are vented through line 72. These reaction gases comprise, chiefly, carbon dioxide and other microbial gaseous byproducts together with minor amounts of oxygen and methane, as well as the inert nitrogen contained in the air.

In a typical embodiment, the vessels such as illustrated in FIG. 3 can be used in the processes A and B previously described. In process A in which the liquid is foamed only with the methane charge and thereafter air is introduced through the foam composition, the initial foaming of the liquid is performed by introducing methane only through line 67. After the foam has formed, it will be stable for approximately 3 hours, during which time air is slowly introduced through line 68 and through the sparger to bubble through the foam composition. This air is removed from the process through vent line 72. Tanks sufficient for performing the process described in Case A can have a diameter from about 35 to 40 feet and a height of about 8 feet and can be provided with a foam composition having a depth of about 5 feet. The first stage of Case A employs one of these tanks, the second stage employs two tanks, and the third stage employs four tanks.

In the process B, previously described, the air and methane are simultaneously foamed in the liquid medium which has additives to impart a stability to the foam composition of approximately 36 minutes. The gases are reintroduced upon collapse of the foam so as to form a new foam composition at 5 periodic intervals during the 3-hour residence time in the tanks. In this embodiment, two of these tanks are employed in the first stage, 4 in the second stage and 8 in the third stage of the process.

Figure 4:
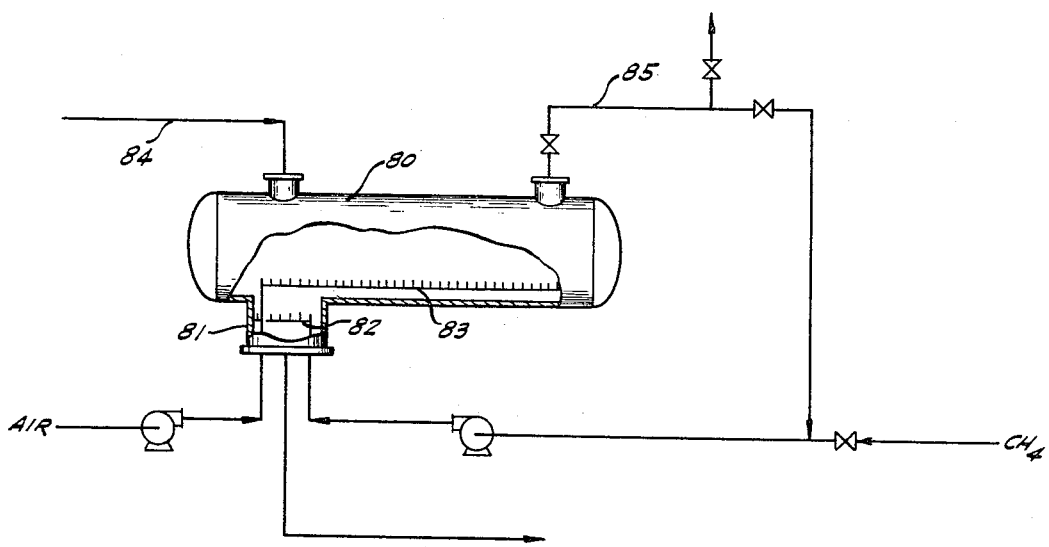
FIG. 4 illustrates a fermentation vessel for superatmospheric pressure operation.

FIG. 4 illustrates a vessel that can be used for performing the process at superatmospheric pressures. This vessel is designed for a 200 pound pressure service and is used in the illustrated process at about 10 atmospheres, i.e., 150 p.s.i. This reaction vessel compries a generally cylindrical tank 80 having a leg 81 for the accumulation of liquid and equipped with a methane gas sparger such as 82 and/or an air-gas sparger 83. Suitably, the methane sparger can be extended along the entire length of this vessel in juxtaposition to sparger 83. Provision can be made for introduction of the liquid aqueous culture medium through line 84 and removal of gaseous products and byproducts through line 85.

In the preceding illustrative example of the process, the vessels similar to those shown in FIG. 4 can be used with a 200 p.s.i. rating. For each of Cases C and D, vessels can have a diameter of 12 feet and a shell thickness of about 1⅜ inches. For Case C, seven vessels, each 65 feet in length can be employed with one vessel in the first stage, two in the second stage and four in the third stage of the fermentation process. For Case D, wherein a foam stability of approximately 36 minutes is employed, rather than 3 hours as in Case C, three vessels are employed having the following dimensions:

First stage—12 by 21 feet
Second stage—12 by 32 feet; and
Third stage—12 by 54 feet.

In the example of Case E where only the methane is present as the discontinuous gas phase of the foam and air is sparged slowly through the foam during the fermentation, considerably smaller reaction volumes are necessary. In this application, tanks of 6 feet diameter and shell thicknesses of ¾ inch can be used. A total of nine tanks are employed, with two tanks in the first stage, three tanks in the second stage, and four tanks in the third stage with tanks having a length from about 24 to 27 feet.

The process achieves a high degree of conversion of the gaseous reactants. In the illustrated example, the conversion of methane is approximately 90 percent with the yield of cells being approximately 60 weight percent based on converted methane. When the oxygen is entrapped as the discontinuous gas phase within the foam composition, the conversion achievable on the oxygen is approximately 80 weight percent. The microorganism efficiency, i.e., yield of microorganisms based on oxygen converted is approximately 19 weight percent.

The gas discharged from the fermentation vessels schematically represented as vessels 35, 36, 37 in FIG. 2 comprise chiefly nitrogen with carbon dioxide and minor amounts of oxygen and unconverted methane. If desired, this gas stream can be passed into an absorption unit which is of conventional type and is used to absorb the hydrocarbon portion of the gas stream prior to venting of the gas stream to the atmosphere.

The preceding illustrative practice of my invention is presented solely to illustrate the presently preferred mode of practice thereof. It is not intended that this illustration be construed as unduly limiting of the invention, but instead it is intended that any of the reagents, or method steps or their obvious equivalents can be employed without departing from the scope of the invention.

I claim:

1. The method for the production of protein from a gaseous normal alkane having from 1 to 5 carbons that comprises incorporating in an aqueous culture medium from about 0.05 to 5.0 weight percent of a microorganism, capable of utilizing said alkane for microbial energy and carbon from 0.1 to 5.0 weight percent of inorganic nutrients to sustain said microorganism and at least one foam additive selected from (1) a surface active agent in an amount sufficient to reduce the surface tension of the aqueous culture medium to between about 15 to 50 dynes per centimeter and (2) a protective colloid in an amount sufficient to increase the viscosity of the aqueous medium to between about 5 to 200 centipoises at 25° C. and thereafter admixing one of the gaseous reactants of said alkane and oxygen with said aqueous culture medium to prepare a foam composition containing said one of said gaseous reactants as a discontinuous phase, free of the other of said reactants, and slowly introducing the other of said reactants into contact with said foam for a period of from 3 to 48 hours while maintaining said foam at a temperature of 15° to 60° C.

2. The method of claim 1 wherein said foam composition contains said alkane as the discontinuous gas phase.

3. The method of claim 2 wherein said alkane is methane.

4. The method of claim 1 wherein said temperature is maintained from 20° to 45° C.

5. The method of claim 1 wherein said aqueous culture medium has a pH from 6.5 to 8 and said microorganism is a bacteria.

6. The method of claim 1 wherein said aqueous culture medium has a pH from 3 to 6 and said microorganism is a yeast.

7. The method of claim 1 wherein said period is from 10 to 20 hours.

8. The method of claim 1 wherein said one of said gaseous reactants and said aqueous culture medium are admixed to prepare a foam having from 3/1 to 40/1 parts of said gaseous reactant per part of aqueous culture medium.

9. The method of claim 1 wherein said one of said gaseous reactants and said aqueous culture medium are admixed to prepare a foam having from 5/1 to 20/1 parts by volume of said gaseous reactant per part of aqueous culture medium.

10. The method of claim 1 wherein said one of said gaseous reactants and said aqueous culture medium are admixed to prepare a foam having from 7/1 to 15/1 volume parts of gaseous reactant per volume part of aqueous culture medium.

11. The method of claim 1 wherein said protective colloid is a protein.

12. The method of claim 1 wherein said oxygen is admixed with said aqueous culture medium to prepare said foam composition containing oxygen as the discontinuous gas phase.

13. The method for production of protein from a gaseous normal alkane which comprises: preparing an aqueous culture medium containing 0.05 to 5.0 weight percent of a microorganism capable of utilizing said alkane for microbial energy and carbon and from 0.1 to 5.0 weight percent of inorganic nutrients to sustain said microorganism, incorporating in said aqueous culture medium at least one foam additive selected from (1) an agent in an amount sufficient to reduce the surface tension of the aqueous cultural medium to between about 15 and 50 dynes per centimeter and (2) a protective colloid in an amount sufficient to increase the viscosity of the aqueous medium to between about 5 and 200 centipoises at 25° C., admixing said alkane with a first portion of said aqueous culture medium to form a first foam containing said alkane as a separate, discontinuous phase, admixing an elemental oxygen containing gas with a second portion of said aqueous medium to form a second foam containing said elemental oxygen containing gas as a separate, discontinuous phase, blending said first and second foams together to prepare a mixed foam containing both said alkane and elemental oxygen containing gases as separate, discontinuous phases and maintaining said mixed foam at a temperature of 150 to 60° C. for a period of 3 to 48 hours.

14. The method of claim 13 wherein said temperature is maintained from 20° to 45° C.

15. The method of claim 13 wherein said aqueous culture medium has a pH from 6.5 to 8 and said microorganism is a bacteria.

16. The method of claim 13 wherein said aqueous culture medium has a pH from 3 to 6 and said microorganism is a yeast.

17. The method of claim 13 wherein said period is from 10 to 20 hours.

18. The method of claim 13 wherein said one of said gaseous reactants and said aqueous culture medium are admixed to prepare a foam having from 3/1 to 40/1 parts of said gaseous reactant per part of aqueous culture medium.

19. The method of claim 15 wherein said protective colloid is a protein.

20. The method of claim 13 wherein said alkane is methane.

References Cited

UNITED STATES PATENTS

| | | | |
|---|---|---|---|
| 2,482,900 | 9/1949 | Hatch et al. | 195—107 |
| 2,697,062 | 12/1954 | Cramer | 195—3 H |
| 2,981,629 | 4/1961 | Ginnette et al. | 99—206 |
| 3,293,145 | 12/1966 | Leavitt et al. | 195—3 H UX |
| 3,355,296 | 11/1967 | Perkins et al. | 195—28 RX |
| 3,474,001 | 10/1969 | Leavitt | 195—28 |

JOSEPH M. GOLIAN, Primary Examiner

U.S. Cl. X.R.

195—107, 109

UNITED STATES PATENT OFFICE
CERTIFICATE OF CORRECTION

Patent No. 3,677,895                     Dated    July 18, 1972

Inventor(s)  Saburo Hashimoto

It is certified that error appears in the above-identified patent and that said Letters Patent are hereby corrected as shown below:

Column 16, line 31, "150" should be -- 15° --.

Signed and sealed this 2nd day of January 1973.

(SEAL)
Attest:

EDWARD M.FLETCHER,JR.                ROBERT GOTTSCHALK
Attesting Officer                    Commissioner of Patents